(12) United States Patent
Cole et al.

(10) Patent No.: US 7,086,497 B2
(45) Date of Patent: Aug. 8, 2006

(54) INDUCTION SYSTEM WITH LOW PASS FILTER FOR TURBO CHARGER APPLICATIONS

(75) Inventors: Roderic Cole, Chatham (CA); Jason Pettipiece, Chatham (CA); Mark Letourneau, Dover Centre (CA)

(73) Assignee: Siemens VDO Automotive Inc., Chatham (CA)

( * ) Notice: Subject to any disclaimer, the term of this patent is extended or adjusted under 35 U.S.C. 154(b) by 623 days.

(21) Appl. No.: 10/256,279

(22) Filed: Sep. 26, 2002

(65) Prior Publication Data

US 2003/0072459 A1   Apr. 17, 2003

Related U.S. Application Data

(60) Provisional application No. 60/325,372, filed on Sep. 27, 2001.

(51) Int. Cl.
*F01N 7/08* (2006.01)
*F01N 1/08* (2006.01)
*F01N 7/18* (2006.01)

(52) U.S. Cl. .............. 181/248; 181/270; 181/281; 181/282

(58) Field of Classification Search ........... 181/269, 181/270, 281, 282, 224, 225; 29/890.08
See application file for complete search history.

(56) References Cited

U.S. PATENT DOCUMENTS

| | | | | |
|---|---|---|---|---|
| 1,614,633 A * | 1/1927 | Smith | ........................ | 181/281 |
| 2,308,886 A * | 1/1943 | Mason | ........................ | 181/224 |
| 2,651,381 A * | 9/1953 | Cooper | ........................ | 181/281 |
| 2,730,188 A * | 1/1956 | Bailey | ........................ | 181/255 |
| 3,092,206 A * | 6/1963 | Moreau | ........................ | 181/270 |
| 3,724,591 A * | 4/1973 | Malkiewicz | ........................ | 181/265 |
| 4,116,269 A * | 9/1978 | Ikeda | ........................ | 165/126 |
| 4,241,805 A * | 12/1980 | Chance, Jr. | ........................ | 181/232 |
| 4,327,816 A * | 5/1982 | Bennett | ........................ | 181/292 |
| 4,336,863 A * | 6/1982 | Satomi | ........................ | 181/224 |
| 4,346,781 A * | 8/1982 | Ingard et al. | ........................ | 181/206 |
| 4,584,924 A * | 4/1986 | Taguchi | ........................ | 89/14.4 |
| 4,671,381 A * | 6/1987 | Rascov | ........................ | 181/255 |
| 4,756,045 A * | 7/1988 | Gans et al. | ........................ | 15/300.1 |
| 5,250,764 A * | 10/1993 | Doychak et al. | ........................ | 181/224 |
| 5,302,783 A | 4/1994 | Sadr | | |
| 6,105,717 A * | 8/2000 | Kleukers | ........................ | 181/282 |
| 6,283,162 B1* | 9/2001 | Butler | ........................ | 138/177 |
| 6,688,425 B1* | 2/2004 | Cole et al. | ........................ | 181/264 |
| 2001/0037836 A1* | 11/2001 | Yoshitoshi et al. | ........................ | 138/115 |

FOREIGN PATENT DOCUMENTS

DE     29606554 U1    8/1996

(Continued)

*Primary Examiner*—Edgardo San Martin

(57) ABSTRACT

A flow tube for an induction system with a turbo charger includes a first tube half and a second tube half with a noise attenuation plate positioned between the halves. The noise attenuation plate includes a plurality of holes having varying diameters and depths. The first tube half, the second tube half, and the noise attenuation plate are integrally formed as a single piece during an injection molding process. The noise attenuation plate is folding along a first living hinge to overlap one of the first or second tube halves. The other of the first or second tube halves is folded along a second living hinge to overlap the noise attenuation plate forming a flow tube that defines a flow path. The noise attenuation plate serves as a low pass filter that attenuates high frequencies while allowing lower frequencies through.

23 Claims, 2 Drawing Sheets

FOREIGN PATENT DOCUMENTS

| | | |
|---|---|---|
| DE | 19703414 A1 | 8/1998 |
| DE | 19943246 A1 | 3/2001 |
| DE | 10026355 A1 | 1/2002 |
| FR | 2736329 A1 | 1/1997 |
| JP | 02298621 A * | 12/1990 |
| WO | WO 97/02190 A1 | 1/1997 |
| WO | WO 97/09527 A1 | 3/1997 |
| WO | WO 99/39087 A1 | 8/1999 |

* cited by examiner

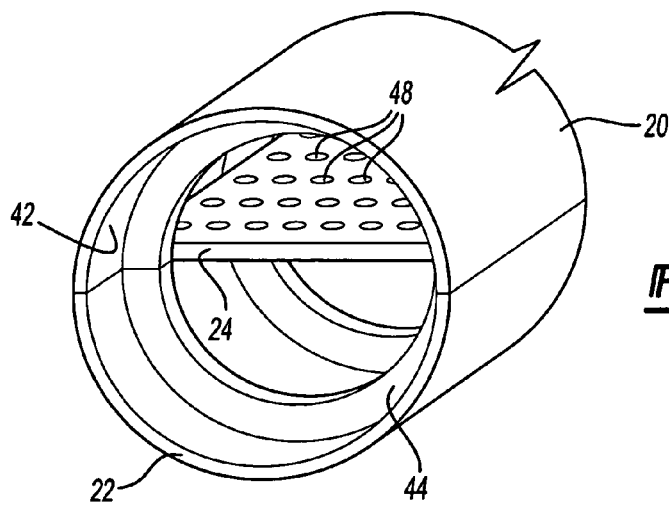
*Fig-4*
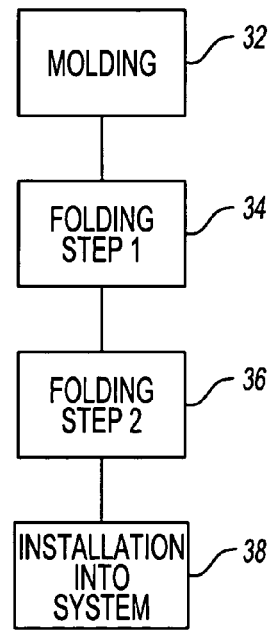
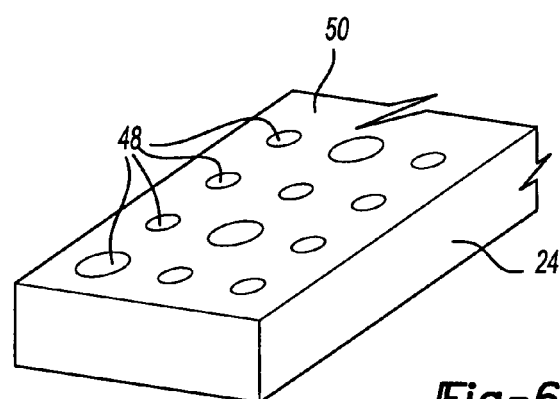
*Fig-5*
*Fig-6*
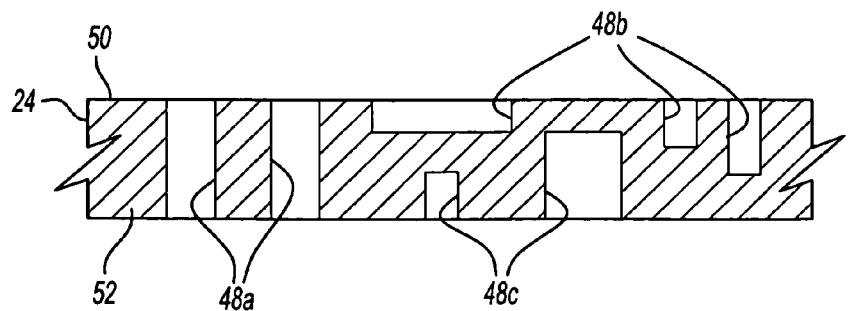
*Fig-7*

INDUCTION SYSTEM WITH LOW PASS FILTER FOR TURBO CHARGER APPLICATIONS

CROSS-REFERENCE TO RELATED APPLICATIONS

The application claims priority to U.S. Provisional Application No. 60/325,372, which was filed on Sep. 27, 2001.

BACKGROUND OF THE INVENTION

This invention relates to a flow tube having an integrally formed low pass filter. Specifically multiple tube portions and a plate portion are integrally formed together during a molding process and folded along hinges to form the final flow tube with an internally positioned noise attenuation plate.

The use of a turbo charger is a simple, compact, and effective way to increase engine power without increasing the size of the engine itself. Turbo chargers allow an engine to burn more fuel and air by packing more into existing engine cylinders.

Typically, turbo chargers are attached to an engine exhaust manifold with exhaust from the cylinders causing a turbine to spin. The turbine is connected by a shaft to a compressor, positioned between an air filter and an intake manifold, which pressurizes air going into the cylinders. Both the turbine and the compressor include blades or impellers, which turn at very high speeds during operation.

As the blades rotate, a high frequency whistling noise is generated, which is undesirable. Traditionally, an absorptive material is used to dissipate the unwanted acoustic energy. However, the use of this material increases the risk of engine contamination and can lead to increased engine maintenance or premature engine failure. Further, installation of the absorptive material increases assembly time and cost.

Thus, it is desirable to have a method and system for reducing noise generated by a turbo charger without risking engine contamination, as well as overcoming the other above mentioned deficiencies with the prior art.

SUMMARY OF THE INVENTION

A flow tube for an induction system includes a first tube portion defining first inner tube surface and a second tube portion defining a second inner tube surface. The first and second tube portions are positioned in an overlapping relationship to form a flow path defined by the first and second inner tube surfaces. A plate is positioned in the flow path and cooperates with the tube portions to form a low pass filter. The low pass filter attenuates high frequencies while permitting low frequencies to flow through.

In a preferred embodiment, each tube portion includes a plurality of rib members formed on the inner tube surfaces. The ribs are longitudinally spaced apart from one another along the length of the tube portions. Preferably, each ribbed is spaced at a predetermined equal distance from the next rib. The ribs and the plate positioned within the flow path cooperate to attenuate frequencies above a predetermined level as acoustic energy generated by a turbo charger enters the flow path.

Preferably, the plate includes a plurality of tuned holes to create the low pass filter. The holes can be of varying diameter and varying depth. Further, the holes can be formed in a symmetric or non-symmetric pattern on the upper and/or lower surfaces of the plate.

In a preferred embodiment, the flow tube is formed according to the following process. Each tube portion and the plate are integrally formed together as a single piece during a molding process. A first living hinge is formed between the plate and one of the tube portions and a second living hinge is formed between the two tube portions. The plate is folded along the first living hinge to be positioned in an overlapping position to one of the tube portions and the other tube portion is then folded along the second living hinge to be positioned in an overlapping position to the plate. Thus, the flow tube is molded as a single piece and folded into a final tube shape with a tuned plate positioned centrally in the tube between the tube portions.

The flow tube is preferably used in an induction system for an engine with a turbo charger. When the high frequency acoustic energy generated by the turbo charger encounters the rib and plate formations, the change in impedance causes reflections back toward the turbo charger. Thus, the plates and ribs form a low pass filter mechanism that significantly reduces the high pitch whine generated by the turbo charger.

The subject system and method reduces the magnitude of undesirable noise while eliminating the risk of engine contamination. These and other features of the present invention can be best understood from the following specifications and drawings, the following of which is a brief description.

BRIEF DESCRIPTION OF THE DRAWINGS

FIG. 4 is a perspective view of the flow tube of FIG. 3 showing the other tube half in a folded position.

FIG. 5 is a flowchart describing the inventive method.

FIG. 6 is a perspective view, partially broken away, showing a plate having varying hole sizes.

FIG. 7 is a side view showing a plate having varying opening depths.

DETAILED DESCRIPTION OF A PREFERRED EMBODIMENT

Figure 1:
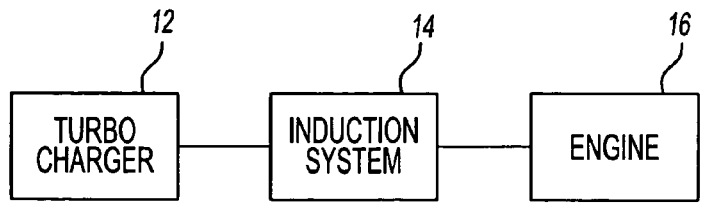
FIG. 1 is a schematic diagram of an engine induction system with a turbo charger.

As shown in FIG. 1, a turbo charger 12 is mounted within an induction system 14 for a vehicle engine 16. The use of a turbo charger 12 is an effective way to increase engine power without increasing the size of the engine 14. The operation of turbo chargers is well known and will not be discussed in further detail.

During operation, the turbo charger 12 generates a high frequency whistling noise. The subject invention is directed toward a flow tube, shown generally at 18 in FIG. 2, that is installed within the flow path of the induction system 14, and which attenuates frequencies above a predetermined level to reduce the high frequency whistling noise.

The flow tube 18 includes a first tube half or tubular portion 20, a second tubular portion 22, and a noise attenuation plate portion 24. The tubular portions 20, 22 and the plate portion 24 are preferably formed from a common plastic material within a common mold 26 during an injection molding process. Any type of plastic material known in the art can be used. Thus, the first 20 and second 22 tubular portions and the plate portion 24 are integrally formed together as a single piece in an injection molding process. Any type of injection molding process known in the art can be used.

The first tubular portion 20, the second tubular portion 22, and the plate portion 24 are preferably positioned in a laterally spaced configuration in the mold 26 with the plate portion 24 at one end. In other words, the first tubular portion 20 is laterally separated from the plate portion 24 by the second tubular portion 22 during the molding process. A first living hinge 28 is formed between the plate portion 24 and the second tubular portion 22 and a second living hinge 30 is formed between the first 20 and second 22 tubular portions.

Figure 3:
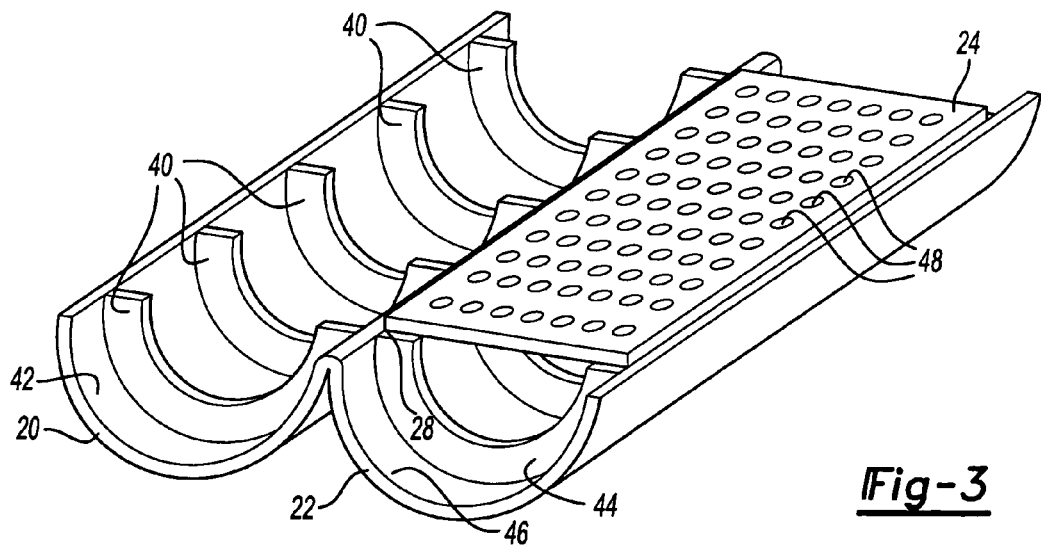
FIG. 3 is a perspective view of the flow tube of FIG. 2 with the plate folded over one of the tube halves.

After removal from the mold 26, the plate portion 24 is folded along one edge via the first living hinge 28 to be positioned in an overlapping relationship to the second tubular portion 22 as shown in FIG. 3. Next, the first tubular portion 20 is folded along one edge via the second living hinge 30 to be positioned in an overlapping relationship to the plate portion 24 and the second tubular portion 22, as shown in FIG. 4.

The steps for this method are shown in the flowchart of FIG. 5. First the tubular portions 20, 22 and the plate portion 24 are integrally molded as a single piece as indicated at 32. Next, the first folding step for the plate 24 is performed, as indicated at 34 and then the second folding step for the first tubular portion 20 is performed, as indicated at 36. Once the folding steps 34, 36 are completed, a flow tube 18 having a generally circular cross-section with a central internal flow path and an internally positioned plate 24 is formed. This flow tube 18 is then installed within the induction system 14 at step 38.

Figure 2:
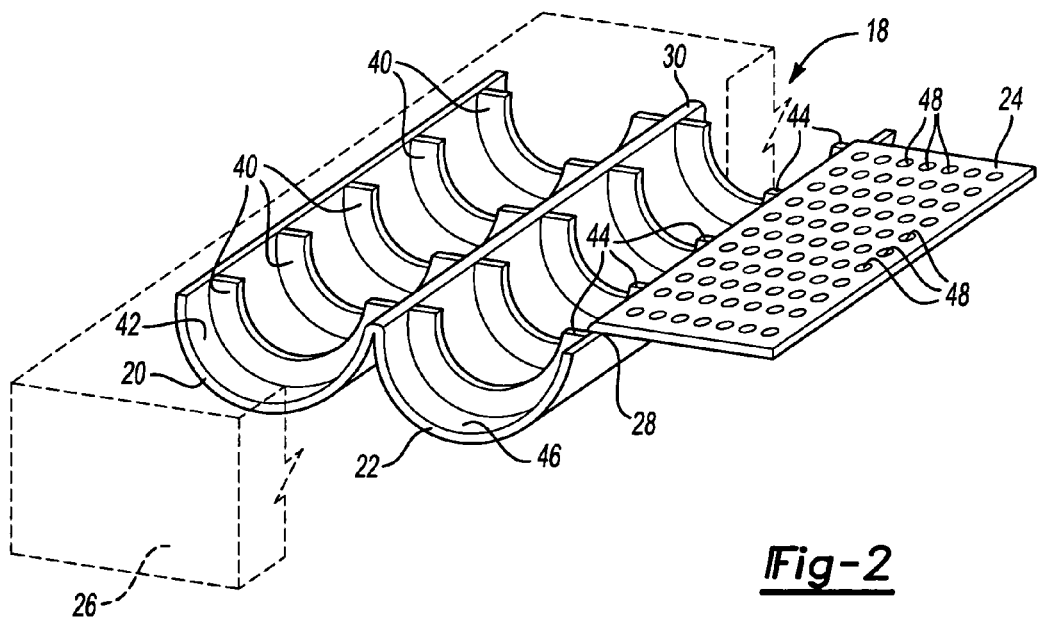
FIG. 2 is a perspective view of a flow tube for the induction system of FIG. 1 with first and second tube halves and a plate molded as a single piece in a mold half.

As shown in FIG. 2, the first tubular portion 20 includes a first plurality of ribs 40 formed on a first inner surface 42. Each rib 40 is longitudinally spaced apart from the next rib 40 along the length of the first tubular portion 20. Each rib 40 is approximately spaced apart from the next rib 40 by a predetermined approximately equal distance. The second tubular portion 22 includes a second plurality of ribs 44 formed on a second inner surface 46. Each rib 44 is longitudinally spaced apart from the next rib 44 along the length of the second tubular portion 22. Each rib 44 is approximately spaced apart from the next rib 44 by a predetermined approximately equal distance. When the first tubular portion 20 is folded over the second tubular portion 22, each one of the first plurality of ribs 40 is aligned with one of the second plurality of ribs 44 (see FIG. 4).

As shown in FIG. 2, the plate portion 24 includes a plurality of depressions or openings 48 formed in a top surface 50. The openings 48 can be formed in a symmetrical pattern as shown in FIGS. 2 and 3, or in a non-symmetrical pattern as shown in FIG. 6. Further, the openings 48 can be of approximately the same size as shown in FIGS. 2 and 3 or can be formed of varying sizes as shown in FIG. 6.

Finally, the openings 48 can also be of varying depth from each other as shown in FIG. 7. Some of the openings 48 can extend from the top surface 50 to a bottom surface 52 to form a through hole 48a, some of the openings 48 can extend from the top surface into the plate portion 24 to form an upper recess or depression 48b, and/or some of the openings 48 can extend from the bottom surface 52 into the plate portion 24 to form a lower recess or depression 48c.

The ribs 40, 44 and the plate portion 24 with the openings 48 cooperate to form a low pass filter in the flow tube 18. The ribs 40, 44 are equally spaced apart from the next rib to allow tuning at a predetermined specific frequency. The openings 48 are also formed in a specific predetermined size, depth, and pattern for tuning purposes. The tuned ribs 40, 44 and tuned openings 48 cooperate to attenuate frequencies above a predetermined level, while allowing lower frequencies through. When acoustic energy created by the turbo charger 12 encounters the low pass filter, the change in impedance causes acoustic reflections back toward the turbo charger 24. Further, because the tubular portion 20, 22 and the plate portion 24 are integrally formed from a plastic material there is minimal risk of engine contamination.

Although a preferred embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method of forming a flow tube with noise attenuation capability for an induction system including a turbo charger comprising the steps of:
   a) integrally forming a first tubular half, a second tubular half, and a noise attenuation plate as a single piece;
   b) folding the noise attenuation plate along one edge to overlap one of the first or second tubular halves; and
   c) folding the other of the first or second tubular halves along one edge to overlap the noise attenuation plate forming a flow tube defining a flow path with an internally positioned noise attenuation plate.

2. A method as set forth in claim 1 including the step of forming a plurality of depressions within the noise attenuation plate during step (a) and attenuating frequencies above a predetermined level as acoustic energy generated by turbo charger enters the flow path after step (c).

3. A method as set forth in claim 2 wherein step (a) further includes forming the first tubular half, the second tubular half, and the noise attenuation plate in a common mold during an injection molding process.

4. A method as set forth in claim 3 wherein step (a) further includes forming the first tubular half, the second tubular half, and the noise attenuation plate from a common plastic material.

5. A method as set forth in claim 3 wherein step (a) further includes laterally spacing the noise attenuation plate from the first tubular half such that the second tubular half is positioned between the first tubular half and the noise attenuation plate in the mold.

6. A method as set forth in claim 5 wherein step (a) further includes forming a first living hinge between the noise attenuation plate and the second tubular half and a second living hinge between the first tubular half and the second tubular half; step (b) further includes folding the noise attenuation plate along the first living hinge to overlap the second tubular half; and step (c) further includes folding the first tubular half along the second living hinge to overlap the second tubular half.

7. A method as set forth in claim 2 wherein step (a) includes forming the plurality of depressions as a plurality of holes having non-uniform size and non-uniform depth from at least one other hole.

8. A method as set forth in claim 1 wherein step (a) further includes forming a first plurality of ribs on a first inner surface of the first tubular half and forming a second plurality of ribs on a second inner surface of the second tubular half; and step (c) includes aligning each one of the first plurality of ribs with one of the second plurality of ribs.

9. A method as set forth in claim 8 further including the step tuning the first and second plurality of ribs to a predetermined frequency by longitudinally spacing the first plurality of ribs apart from each other by a predetermined equal distance.

10. A turbo charger induction system comprising:
a first tubular portion including a first plurality of longitudinally spaced ribs formed on a first inner tube surface;
a second tubular portion including a second plurality of longitudinally spaced ribs formed on a second inner tube surface, said second tubular portion positioned in an overlapping relationship to said first tubular portion to form a flow path defined by said first and second inner tube surfaces; and
a plate positioned within said flow path and generally between said first and second plurality of ribs to form a low pass filter for attenuating frequencies above a predetermined level as acoustic energy generated by a turbo charger enters said flow path.

11. A system as set forth in claim 10 wherein each one of said first plurality of longitudinally spaced ribs is aligned with one of said second plurality of longitudinally spaced ribs.

12. A system as set forth in claim 11 wherein said first and second tubular portions are integrally formed as a single piece with a first living hinge formed between said first and second tubular portions.

13. A system as set forth in claim 12 wherein said plate is integrally formed with one of said first or second tubular portions as a single piece with a second living hinge formed between said plate and said one of said first or second tubular portions.

14. A system as set forth in claim 13 wherein said first tubular portion, said second tubular portion, and said plate are formed from a common plastic material.

15. A system as set forth in claim 10 wherein said plate includes a plurality of holes of varying size and depth from each other.

16. A system as set forth in claim 10 wherein said first plurality of longitudinally spaced ribs are spaced at an approximately equal distance apart from one another and said second plurality of longitudinally spaced ribs are spaced at an approximately equal distance apart from each other.

17. A system as set forth in claim 10 wherein said first and second plurality of longitudinally spaced ribs are formed within said first and second tubular portions to be tuned to a predetermined frequency.

18. A method as set forth in claim 1 including the step of providing the flow tube as a single tube having unlined walls.

19. A method as set forth in claim 1 including the step forming the noise attenuation plate as a substantially planar member, and positioning the noise attenuation plate within the flow path to form upper and lower flow path portions.

20. The system as set forth in claim 10 wherein said first and said second tubular portions and said first and said second plurality of ribs are formed from a solid plastic material.

21. A turbo charger induction system comprising:
a first tubular portion including a first unlined inner tube surface;
a second tubular portion including a second unlined inner tube surface, said second tubular portion positioned in an overlapping relationship to said first tubular portion to form a flow path defined by said first and second unlined inner tube surfaces; and
a noise attenuation plate positioned within said flow path to form a low pass filter for attenuating frequencies above a predetermined level as acoustic energy generated by a turbo charger enters said flow path.

22. The system as set forth in claim 21 wherein said noise attenuation plate includes a plurality of depressions.

23. The system as set forth in claim 21 wherein said first and said second tubular portions each include a plurality of solid plastic ribs integrally formed on said first and said second unlined inner tube surfaces.

* * * * *